United States Patent
Zhang et al.

(10) Patent No.: US 7,158,199 B2
(45) Date of Patent: *Jan. 2, 2007

(54) LIQUID CRYSTAL DISPLAY APPARATUS CONTAINING IMAGE SENSOR AND PROCESS FOR PRODUCING THE SAME

(75) Inventors: Hongyong Zhang, Kanagawa (JP); Masayuki Sakakura, Kanagawa (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/140,700

(22) Filed: May 31, 2005

(65) Prior Publication Data

US 2005/0206830 A1    Sep. 22, 2005

Related U.S. Application Data

(60) Continuation of application No. 10/743,482, filed on Dec. 22, 2003, now Pat. No. 6,937,306, which is a continuation of application No. 10/288,958, filed on Nov. 6, 2002, now Pat. No. 6,680,764, which is a division of application No. 09/143,109, filed on Aug. 28, 1998, now Pat. No. 6,496,240.

(30) Foreign Application Priority Data

Sep. 2, 1997    (JP) .................................. 9-254316

(51) Int. Cl.
G02F 1/1345    (2006.01)
G02F 1/1333    (2006.01)
(52) U.S. Cl. ................... 349/116; 349/151; 349/158
(58) Field of Classification Search .............. 349/42, 349/116, 158, 43, 153; 250/208.1, 370.14; 257/59, 72; 345/206, 207

See application file for complete search history.

(56) References Cited

U.S. PATENT DOCUMENTS

| | | | |
|---|---|---|---|
| 4,385,292 A | 5/1983 | Nonomura et al. | 340/719 |
| 4,486,748 A | 12/1984 | Nonomura et al. | 340/756 |
| 4,517,733 A | 5/1985 | Hamano | 29/572 |
| 4,545,672 A | 10/1985 | Ozawa | 358/401 |
| 4,760,389 A | 7/1988 | Aoki et al. | 340/719 |
| 4,948,231 A | 8/1990 | Aoki et al. | 350/334 |
| 5,315,101 A | 5/1994 | Hughes et al. | 250/208.1 |
| 5,324,980 A | 6/1994 | Kusunoki | 257/74 |
| 5,340,978 A * | 8/1994 | Rostoker et al. | 250/208.1 |
| 5,349,174 A | 9/1994 | Van Berkel et al. | 250/208.1 |
| 5,423,119 A | 6/1995 | Yang | |
| 5,589,847 A | 12/1996 | Lewis | 345/98 |
| 5,650,637 A | 7/1997 | Kodaira et al. | 257/72 |
| 5,657,100 A | 8/1997 | Yamamoto et al. | 349/41 |
| 5,684,318 A | 11/1997 | Ayres et al. | 257/334 |
| 5,717,224 A | 2/1998 | Zhang | 257/57 |

(Continued)

FOREIGN PATENT DOCUMENTS

JP    56-022473    3/1981

(Continued)

Primary Examiner—Dung T. Nguyen
Assistant Examiner—Tai Duong
(74) Attorney, Agent, or Firm—Cook, Alex, McFarron, Manzo, Cummings & Mehler, Ltd.

(57) ABSTRACT

A liquid crystal display apparatus containing an image sensor, which comprises a liquid crystal display part comprising an active matrix circuit, a peripheral driver circuit for driving the active matrix circuit, and a sensor part, integrated on one substrate, wherein the sensor part is sealed and protected with a sealing part and a counter substrate.

24 Claims, 6 Drawing Sheets

U.S. PATENT DOCUMENTS

| | | | |
|---|---|---|---|
| 5,798,744 A | 8/1998 | Tanaka et al. | 345/92 |
| 5,873,003 A | 2/1999 | Inoue et al. | 396/51 |
| 5,952,992 A | 9/1999 | Helms | 345/102 |
| 5,991,467 A | 11/1999 | Kamiko | 382/312 |
| 6,011,607 A | 1/2000 | Yamazaki et al. | 349/153 |
| 6,087,648 A | 7/2000 | Zhang et al. | 250/208.1 |
| 6,355,942 B1 | 3/2002 | Yamazaki et al. | 257/72 |
| 6,388,652 B1 | 5/2002 | Yamazaki et al. | 345/98 |
| 6,703,643 B1 | 3/2004 | Yamazaki et al. | 257/81 |
| 2002/0056844 A1 | 5/2002 | Yamazaki et al. | 257/81 |
| 2004/0141139 A1 | 7/2004 | Yamazaki et al. | 349/151 |

FOREIGN PATENT DOCUMENTS

| | | |
|---|---|---|
| JP | 62-251723 | 11/1987 |
| JP | 64-006927 | 1/1989 |
| JP | 02-050125 | 2/1990 |
| JP | 6-18845 | 1/1994 |
| JP | 6-22250 | 1/1994 |
| JP | 09-171357 | 6/1997 |

\* cited by examiner

SEALING STRUCTURE OF
THE PRESENT INVENTION

SEALING STRUCTURE OF
THE PRESENT INVENTION

STRUCTURE OF CONVENTIONAL PANEL

PLAN VIEW

CROSS SECTIONAL VIEW TAKEN ON LINE A - B

LIQUID CRYSTAL DISPLAY APPARATUS CONTAINING IMAGE SENSOR AND PROCESS FOR PRODUCING THE SAME

This application is a continuation of U.S. application Ser. No. 10/743,482, filed on Dec. 22, 2003 now U.S. Pat. No. 6,937,306 which is a continuation of U.S. application Ser. No. 10/288,958, filed on Nov. 6, 2002 (now U.S. Pat. No. 6,680,764 issued Jan. 20, 2004) which is a divisional of U.S. application Ser. No. 09/143,109, filed on Aug. 28, 1998 (now U.S. Pat. No. 6,496,240 issued Dec. 17, 2002).

FIELD OF THE INVENTION

The present invention relates to integrated liquid crystal display apparatus having a function of an image sensor, and particularly it relates to the constitution of an image sensor part.

BACKGROUND OF THE INVENTION

A liquid crystal panel, in which a liquid crystal is oriented by applying a voltage to a liquid crystal layer from pixel electrodes, to form an image on a display part, has been known.

A constitution of a conventional liquid crystal panel is briefly described below.

An element substrate comprises an insulating substrate having thereon a display part comprising thin film transistors and a peripheral circuit. The element substrate and a counter substrate are adhered by a sealing material with ensuring a gap between the substrates by a spacer. A liquid crystal is contained between the element substrate and the counter substrate.

The liquid crystal is sandwiched by the pair of substrates and surrounded by the sealing part.

As shown in FIG. 2, the sealing part of the panel is arranged to surround the display part or the display part and the peripheral driver circuit.

In the conventional constitution, the element substrate means a substrate in which an active matrix circuit and the peripheral circuit are provided. The counter substrate arranged as facing the element substrate, in which a counter electrode and a color filter are provided.

In the conventional constitution, a resin for sealing having an ultraviolet setting property or a thermosetting property is used as the sealing material.

An image sensor, on the other hand, has been widely used as an optical sensor converting an image to an electric signal in a copying machine, a digital still camera, a video camera and a facsimile machine.

Recently, a miniature system for incorporating an image and displaying the image is demanded. As a constitution meeting such a demand, a liquid crystal display device with which a sensor module such as a CCD is integrated is considered, but there are problems in consumption power (about 5 W), production cost and size.

The inventors of the invention intend to produce a liquid crystal panel and an image sensor on one substrate by using a MOS thin film transistor.

By using such a constitution, the apparatus can be miniaturized and of a low consumption power (about 50 mW) and low cost.

In the case where a liquid crystal panel and an image sensor are produced on one substrate, the arrangement of the panel and the image sensor and the constitution of the seal become important issue.

An object of the invention is to provide a liquid crystal display panel having a display part and an image sensor on one substrate, which has high reliability and an image sensor of low cost.

SUMMARY OF THE INVENTION

The structure of the liquid crystal panel shown in FIG. 1B corresponds to those shown in FIGS. 4A and 4B.

The invention relates to, as a first aspect, a liquid crystal display apparatus comprising a liquid crystal display part comprising an active matrix circuit, a peripheral driver circuit for driving the active matrix circuit, and a sensor part, integrated on one substrate, wherein the sensor part 120 has a sealed space 307 sealed by a sealing part 104 and a counter substrate 302. By employing such a constitution, the sealed space is completely shielded from an external atmosphere by the substrates and the sealing part.

Furthermore, the counter substrate may be adhered in an inert gas atmosphere to fill the sealed space with an inert gas (such as Ar and $N_2$), so as to prevent deterioration of the sensor part due to a reaction with oxygen contained in the air.

By sealing the sensor part with the sealing part and the counter substrate, an effect is obtained in that inclusion of the liquid crystal and dusts into the sensor part and a damage such as a flaw of the sensor part occurring on an injection step of the liquid crystal can be prevented.

The invention relates to, as a second aspect shown in FIG. 1A, a liquid crystal display apparatus comprising a liquid crystal display part comprising an active matrix circuit, a peripheral driver circuit 111 for driving the active matrix circuit, and a sensor part 120, integrated on one substrate, wherein the sensor part 120 is surrounded by at least one sealing part 104, and a sealing part 103 provided between the liquid crystal display part and the sensor part seals the liquid crystal and protects the sensor part.

By employing such a constitution, inclusion of the liquid crystal and dusts, generation of static charge, and an external impact can be prevented in the sensor part after the adhering step.

Alternatively, as shown in FIGS. 1B, 4A and 4B, the sensor part may be doubly surrounded by plural sealing parts. The outer sealing part functions as a dummy seal. By employing such a constitution, the sensor part 120 can be further prevented from dusts, static charge and external pressures, and the distance between the substrates can be sufficiently maintained. The sensor part may further be surrounded by plural sealing parts in three times, four times or more, or plural sealing parts may be arranged as a dummy seal outside the sealing part of the sensor part.

The invention relates to, as a third aspect, a liquid crystal display apparatus comprising a liquid crystal display part comprising an active matrix circuit, a peripheral driver circuit for driving the active matrix circuit, and a sensor part, integrated on one substrate, wherein a spacer 306 is not present in the sensor part. When the number of the spacers in the sensor part is larger than that in the liquid crystal part, they becomes obstacles upon incorporating an image. Thus, as shown in FIG. 4B, it is preferred that no spacer is present between a receptor of the sensor part and the counter substrate. By employing such a constitution, an image can be incorporated with good quality while uniformly maintaining the distance between the substrates.

Since the sensor part is an element that reacts against external heat, it is preferred that the sensor part is arranged with a sufficient distance to a heat generating circuit such as the peripheral driver circuit, i.e., at a position that is less affected by heat.

By employing such a constitution, the sensor part can be protected from external electrical influence, thermal influence and other physical influence.

In the image sensor of the invention, as shown in FIG. 3A, photo carriers are generated by an amorphous silicon layer 352 having a large light absorption coefficient to visible lights, and the readout of the signals is controlled with a polycrystalline silicon TFT having a large mobility as a switching element.

In the invention, an image sensor formed by the thin film technique and the thin film transistors constituting the display part are formed on one substrate, and an apparatus is obtained at low cost.

The display apparatus of direct vision type containing an image sensor is becoming large scale in future. The substrate is also becoming large scale due to a multi-panels substrate for reducing the production cost.

On the other hand, the sensor part, which is demanded to have a large number of pixels and a miniaturized optical system, is being miniaturized to have a reduced pixel area, and therefore the difference in pixel area between the sensor part and the display part becomes large.

The invention relates to, as a fourth aspect, a liquid crystal display apparatus comprising a liquid crystal display part comprising an active matrix circuit, a peripheral driver circuit for driving the active matrix circuit, and a sensor part, integrated on one substrate, wherein a color filter formed on a counter substrate of the sensor part has a cell size that is smaller than that formed on a counter substrate of the display part, as shown in FIGS. 8A and 8B.

By employing such a constitution, a liquid crystal display panel can be obtained at low cost, in which the sensor part that has a small pixel area and can incorporate an image with good quality is formed on the same substrate as the liquid crystal display part.

The invention relates to, as a fifth aspect shown in FIG. 6B, a liquid crystal display apparatus comprising a liquid crystal display part comprising an active matrix circuit, a peripheral driver circuit for driving the active matrix circuit, and a sensor part, integrated on one substrate, wherein the thickness $d_1$ of a counter substrate of the sensor part is smaller than the thickness $d_2$ of a counter substrate of the liquid crystal display part.

By employing such a constitution, the influence on the optical system attached to the sensor part can be reduced. The thinner the thickness of the counter substrate of the sensor part is, the less the light is refracted, and thus the intensity of light can be maintained to obtain a liquid crystal display panel at low cost, in which the sensor part that has a small pixel area and can incorporate an image with good quality is formed on the same substrate as the liquid crystal display part. The thin counter substrate of the sensor part in the invention includes colorless transparent substrates or films and is not limited to a glass substrate or a quartz substrate.

The invention relates to, as a sixth aspect shown in FIG. 6C, a liquid crystal display apparatus comprising a liquid crystal display part comprising an active matrix circuit, a peripheral driver circuit for driving the active matrix circuit, and a sensor part, integrated on one substrate, wherein the line width of the sealing part surrounding the sensor part is smaller than the line width of the sealing part surrounding the liquid crystal display part.

By employing such a constitution, when a thin substrate is used in the sensor part, the sealing part can be prevented from inclusion in the sensor part, and the substrate can be prevented from cracking.

The invention relates to, as a seventh aspect shown in FIG. 6D, a liquid crystal display apparatus comprising a liquid crystal display part comprising an active matrix circuit, a peripheral driver circuit for driving the active matrix circuit, and a sensor part, integrated on one substrate, wherein a counter substrate of the liquid crystal display part is maintained at a constant substrate distance by the sealing part and a spacer, and a counter substrate of the sensor part is in close contact with the substrate by an adhesive 515.

By employing such a constitution, the sensor part can be completely isolated from the external atmosphere, and deterioration due to contact with the external atmosphere can be prevented. Because the space 507 between the counter substrate and the element substrate of the sensor part brings about refraction of light, the counter substrate and the element substrate is preferably in as close contact therewith as possible, as similar to the thickness of the counter substrate.

In order to have the fourth to seventh constitutions, precision is required in mating the sensor part having a small cell size and the counter substrate on the step of adhesion to the counter substrate. Therefore, the counter substrate of the sensor part and the counter substrate of the liquid crystal display part are adhered separately from each other.

The invention relates to a process for producing a liquid crystal display apparatus containing an image sensor and comprising a liquid crystal display part comprising an active matrix circuit, a peripheral driver circuit for driving the active matrix circuit, and a sensor part, integrated on one substrate, the process comprising in this order a step of adhering a counter substrate of the liquid crystal display part, a step of cutting the counter substrate of the liquid crystal display part, and a step of adhering a counter substrate of the sensor part.

As shown in FIGS. 6A to 6D, the display part and the sensor part are formed on one substrate, but the counter substrates 502 and 503 are separated from each other in the display part and the sensor part.

BRIEF DESCRIPTION OF THE DRAWINGS

FIG. 8A shows a cell size of a color filter on a counter substrate of a display part while

DETAILED DESCRIPTION OF THE PREFERRED EMBODIMENTS

The invention is described in more detail with reference to the following examples, but the invention is not construed as being limited thereto.

EXAMPLE 1

Figure 1A:
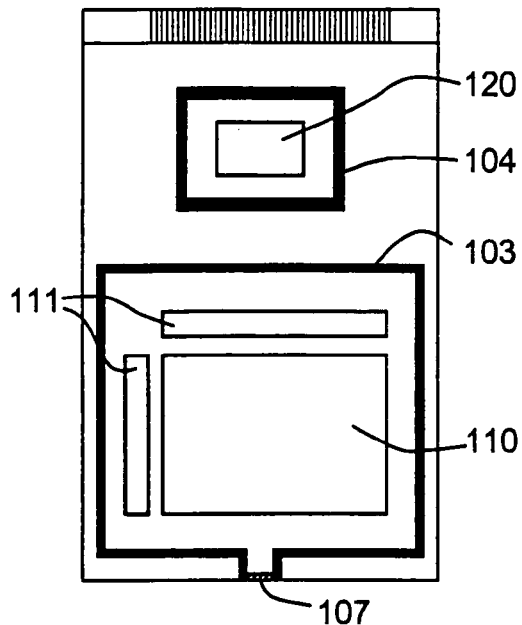
FIGS. 1A and 1B are diagrammatic plan views showing the structures of the liquid crystal panels of the invention.
Figure 1B:
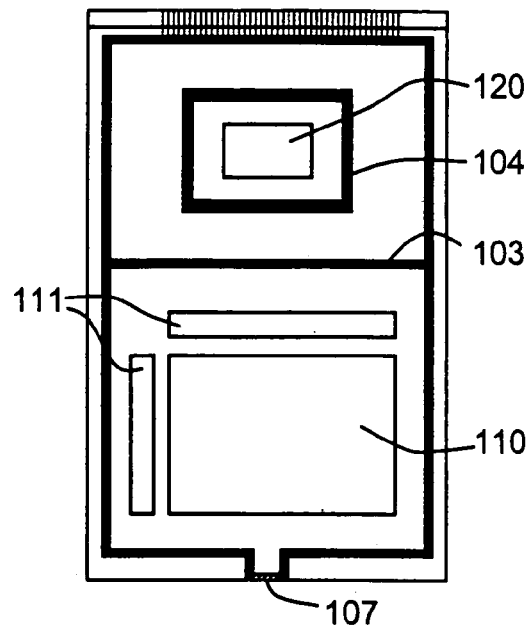
Figure 2:
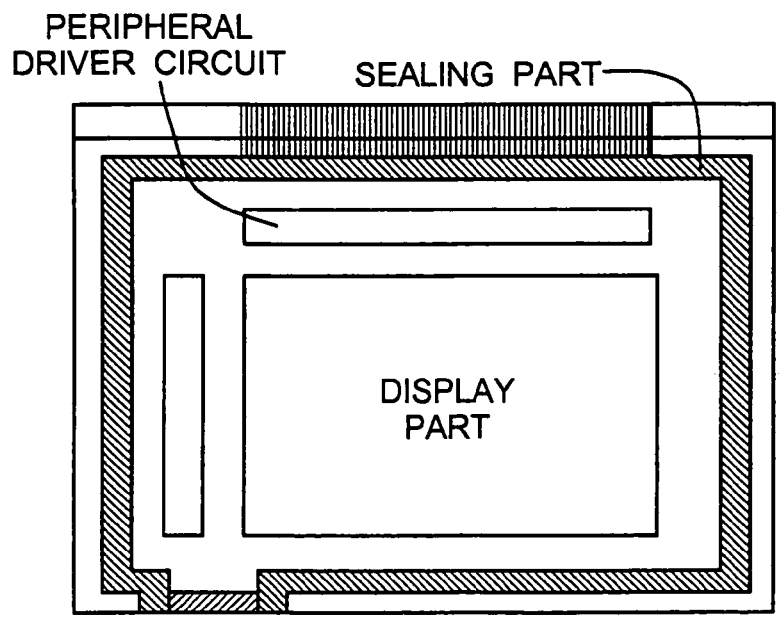
FIG. 2 is a diagrammatic plan view showing the structure of the conventional liquid crystal panel.
Figure 3A:
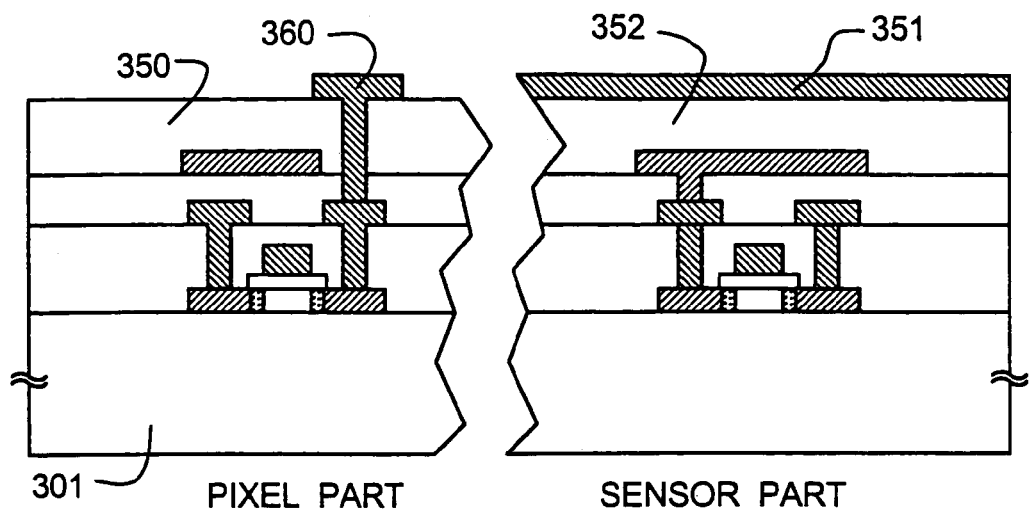
FIGS. 3A to 3D are fragmentary sectional views showing the production step in Example 1.
Figure 3B:
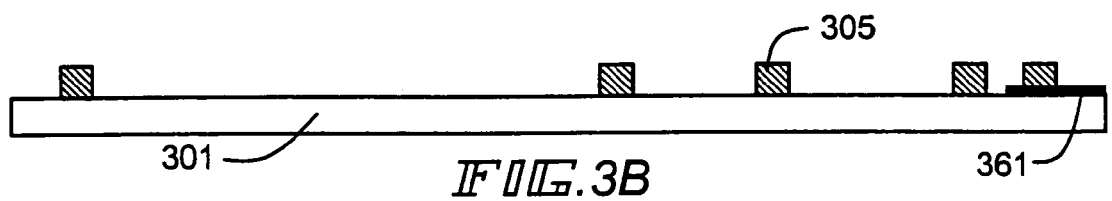
Figure 3C:
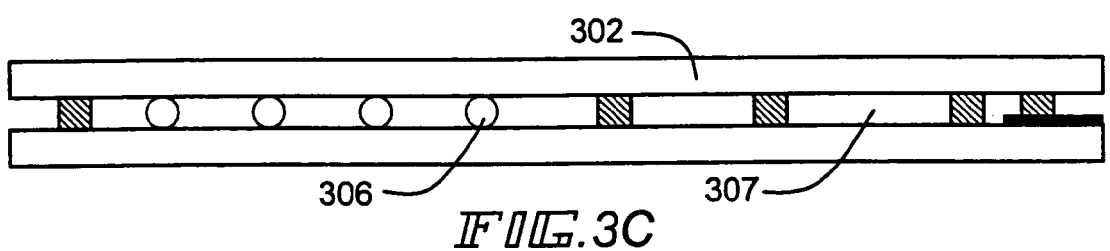
Figure 4A:
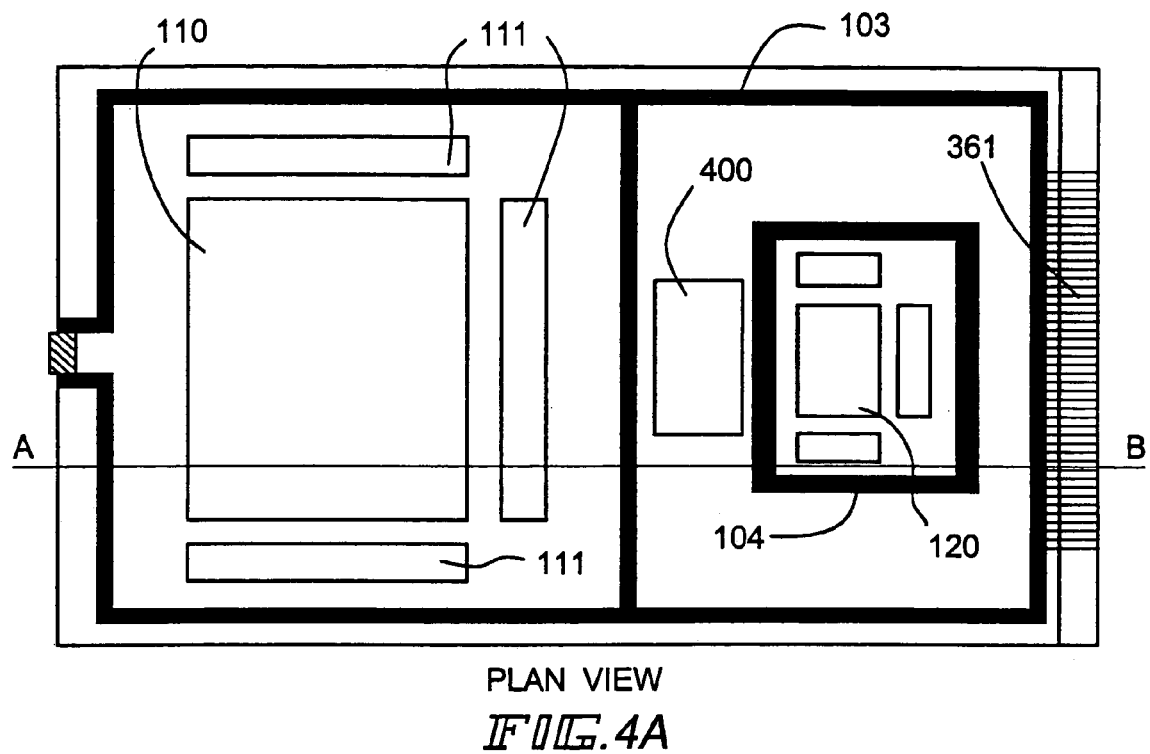
FIG. 4A is a plan view showing the structure of the liquid crystal panel of Example 1.
Figure 4B:
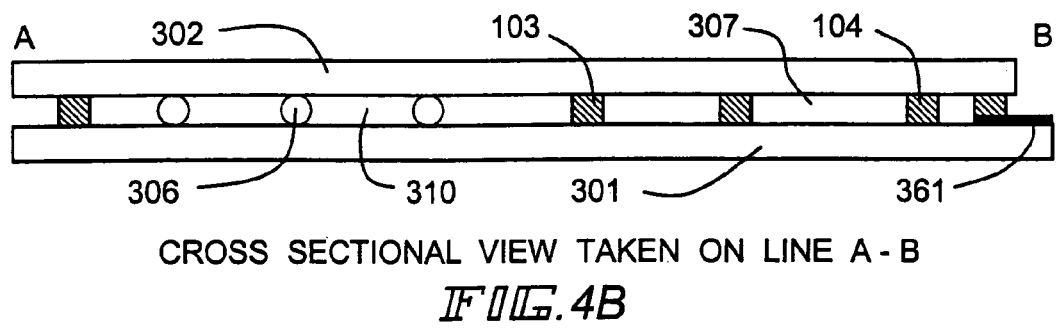
FIG. 4B is a cross sectional view taken on line A–B of FIG. 4A.

The production process of the panel is described by referring to FIGS. 3A to 3C. The completion drawing is shown in FIGS. 4A, 4B and 1B.

An element substrate 301 is prepared.

In this Example, the element substrate 301 is a substrate shown in FIG. 3A having an active matrix circuit and a peripheral circuit each comprising a TFT part, and a sensor part. The element substrate is not limited if it has a pixel region and a peripheral circuit each comprising TFT elements.

The sensor part comprises a photoelectric conversion layer 352 and a photoelectric conversion element.

The sensor part is formed simultaneously with the formation of the thin film transistors constituting the active matrix circuit and the peripheral circuit.

An oriented film (not shown in Figure) for the orientation of the liquid crystal is coated on the element substrate and a counter substrate, and then baked, followed by subjecting to a rubbing treatment.

A seal pattern and a dummy seal part are provided on the element substrate with a sealing material 305 by using a seal printing machine or a seal dispenser, as shown in FIG. 3B. In this Example, while the seal pattern is provided on the element substrate, a step where the seal pattern is provided on the counter substrate may be employed.

As the constitution of each of the panels, the sealing part 103 is arranged to surround the display part 110 and the peripheral driver circuit region 111. The sensor part is arranged to be surrounded by the sealing part 104.

A seal opening 107 is provided at least a part of the sealing part 103 of the each of the panels, so as to be capable of injecting a liquid crystal material from the opening to the inside of the sealing part.

A solution of an epoxy resin and a phenol hardening agent dissolved in a ethyl cellosolve is used as the material for the sealing part in this Example, but it is not particularly limited if it is a resin for sealing having an ultraviolet setting property or a thermosetting property.

Spacers 306 for maintaining the distance between the substrates are scattered selectively on the display part. Spherical bodies having a diameter of 5 µm comprising a polymer series material, a glass series material or a silica series material are used as the spacer.

The counter substrate 302 is prepared.

The counter substrate 302 is a substrate provided to be arranged as facing the element substrate, on which a counter electrode and a color filter are provided.

The element substrate provided by the above-described steps and the counter substrate are superimposed and adhered by heat press, as shown in FIG. 3C.

An injection inlet for a liquid crystal material is provided by a cutting step using a scriber and a breaker, in such a manner that one or more of the inlet is provided on a side where both of the edges of the pair of panels are matched.

Since a leader line of wiring is provided in this Example, the side where the leader line is provided is also cut by a scriber.

A step of injecting the liquid crystal material 310 into the inside of the panels constituting the liquid crystal apparatus is conducted by a vacuum injection method. The vacuum injection method is an injection method for a liquid crystal material utilizing capillarity and difference in pressure.

The liquid crystal material 310 is injected by the vacuum injection method onto the pixel region and the peripheral driver circuit region inside the sealing part of the panel through the injection inlet.

As the liquid crystal material, a nematic liquid crystal, a smectic liquid crystal, a cholesteric liquid crystal and other various liquid crystals may be used. A nematic liquid crystal is used in this Example.

Figure 3D:
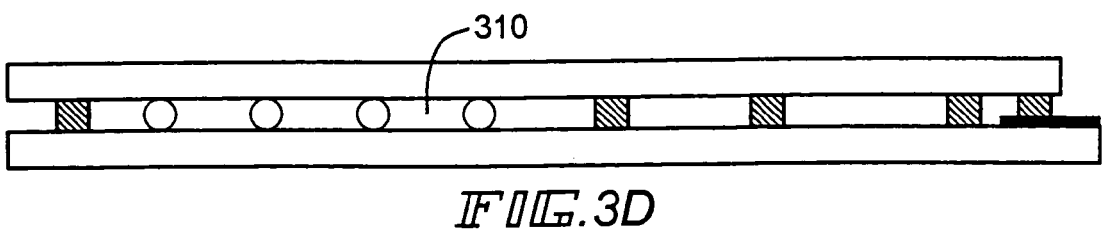

A pressure is applied to the panels from the both sides thereof to expel an excessive amount of the liquid crystal material, and with maintaining the applied pressure, a sealing resin 118 of ultraviolet setting type or thermosetting type is coated on the injection inlet, followed by removing the pressure. Thus, the sealing resin is slightly drawn into the inside of the injection inlet. The sealing resin is hardened in this state to seal the injection inlet, as shown in FIG. 3D.

A panel comprising a pair of substrates sandwiching a liquid crystal as shown in FIGS. 1B, 4A and 4B is obtained by the above-described procedures. Polarizers are attached on both sides of the panel, and wiring electrically connecting to the outside is provided, to complete the liquid crystal display apparatus.

An optical system is attached to the sensor part, to complete the liquid crystal display apparatus containing an image sensor.

EXAMPLE 2

In this Example, the case where the counter substrate of the sensor part and the counter substrate of the display part are separated from each other is exemplified.

The basic constitution of this Example is the same as that produced in Example 1, and therefore the description is made noting the differences.

Figure 6A:
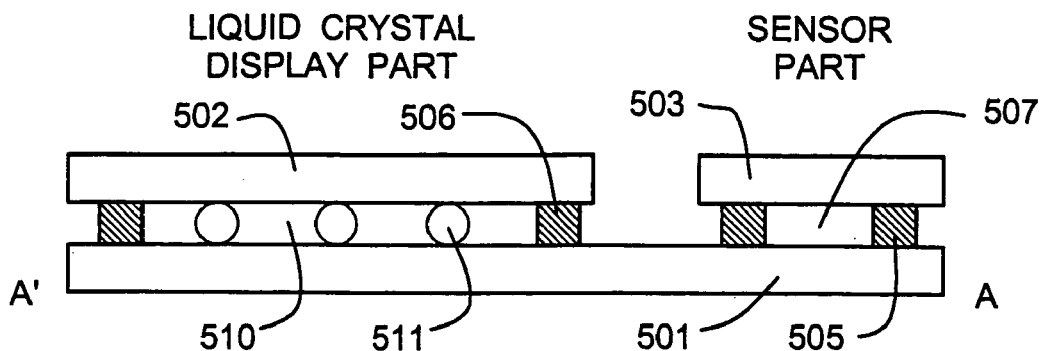
FIGS. 6A to 6C are cross sectional views showing the structures of the liquid crystal panels of Examples 2 to 3 taken on line A–A' of FIG. 5A.
Figure 6B:
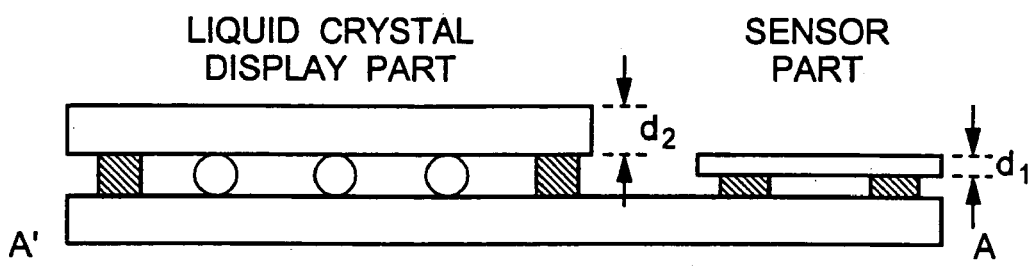

In the final structure of this Example shown in FIG. 6A, the display part and the sensor part are formed on one substrate 501, but the counter substrate 502 of the display part and the counter substrate 503 of the sensor part are separated from each other.

Figure 8A:
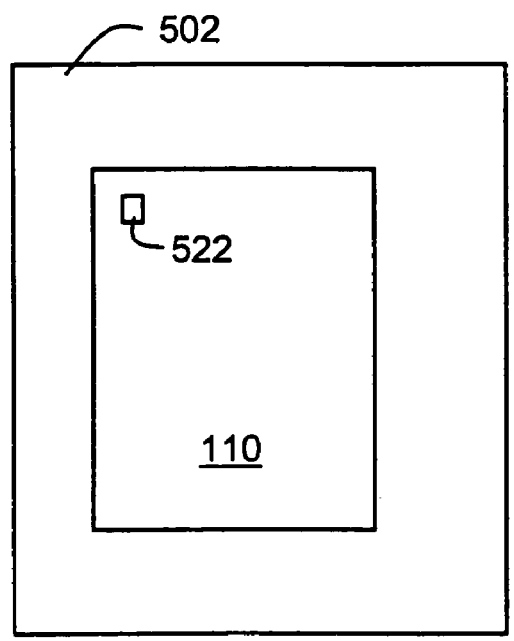
Figure 8B:
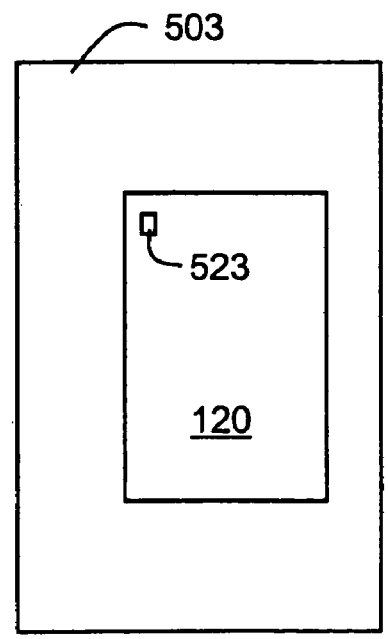
FIG. 8B shows a cell size of a color filter on a counter substrate of a sensor part.

In this case, the cell size of the color filter of the sensor part is required to be smaller than the cell size of the color filter of the liquid crystal display part, as shown in FIGS. 8A and 8B. In FIG. 8B, a cell size 523 of a color filter on a counter substrate 503 of a sensor part 120 is smaller than a cell size 522 of a color filter on a counter substrate 502 of a display part 110 in FIG. 8A.

Therefore, it is preferred that the cell size of the counter substrate of the sensor part and the cell size of the counter substrate of the liquid crystal display part are different from each other. The production method thereof may be either a method where a counter substrate on which color filters having different cell sizes are formed on one substrate is used, or a method where the counter substrate of the sensor part and the counter substrate of the display part are separately adhered.

EXAMPLE 3

In this Example, the case where a substrate thinner than the counter substrate of the display part is used as the counter substrate of the sensor part is exemplified.

The basic constitution of this Example is the same as that produced in Example 2, and therefore the description is made noting the differences.

Figure 6C:
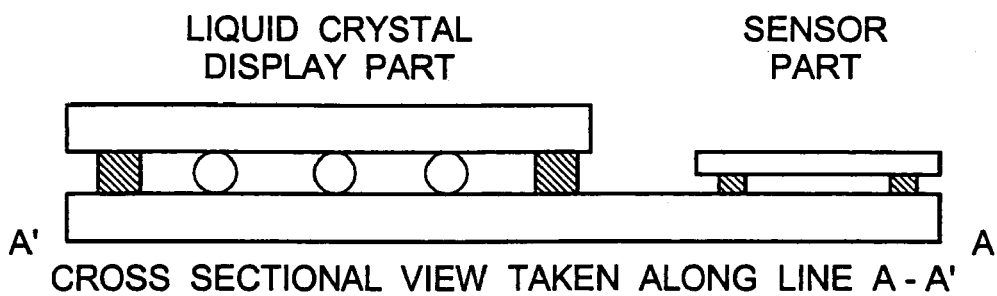

The constitution of this Example is shown in FIG. 6C.

The thickness of the counter substrate of the sensor part of this Example is smaller than the counter substrate of the liquid crystal display part and is from 0.1 to 2.0 mm, preferably from 0.1 to 1.0 mm. The line width of the sealing part surrounding the sensor part is smaller than the line width of the sealing part surrounding the liquid crystal display part (from 1 to 1.3 mm).

The thinner counter substrate of the sensor part in this Example is not limited to a glass substrate if it is a colorless transparent substrate or a film transmitting light.

By employing such a constitution, the influence on the optical system attached to the sensor part can be reduced. The thinner the thickness of the counter substrate of the sensor part is, the less the light is refracted, and thus the intensity of light can be maintained to obtain a liquid crystal display panel at low cost, in which the sensor part that has a small pixel area and can incorporate an image with good quality is formed on the same substrate as the liquid crystal display part.

By making the line width of the sealing part surrounding the sensor part smaller than the line width of the sealing part surrounding the liquid crystal display part, the distance between the substrate of the sensor part and that of the liquid crystal display part are differentiated.

EXAMPLE 4

In this Example, the case where the counter substrate of the sensor part and the counter substrate of the display part are in close contact with each other by using an adhesive is exemplified.

The basic constitution of this Example is the same as that produced in Example 2, and therefore the description is made noting the differences.

Figure 5A:
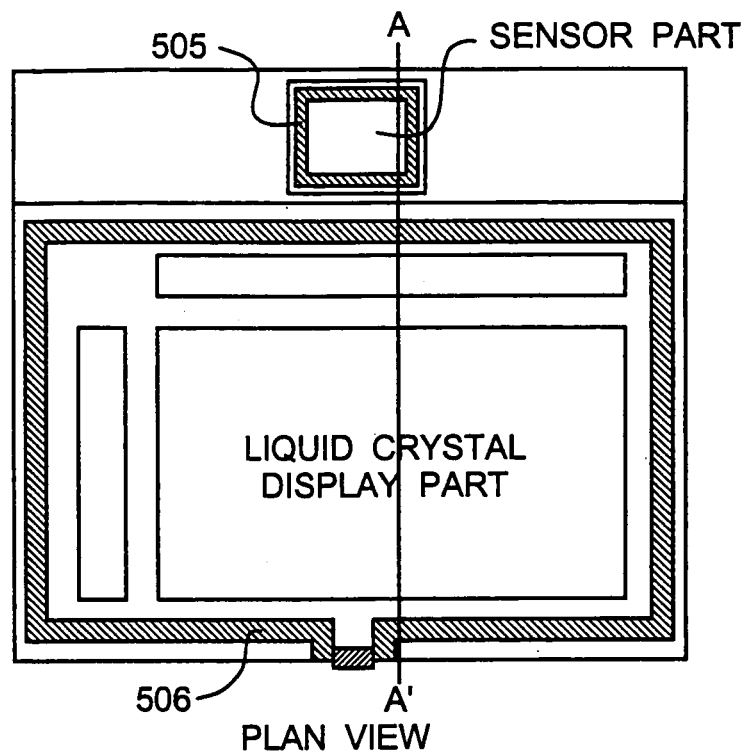
FIG. 5A is a diagrammatic plan view showing the structures of the liquid crystal panels of Examples 2 to 3.
Figure 5B:
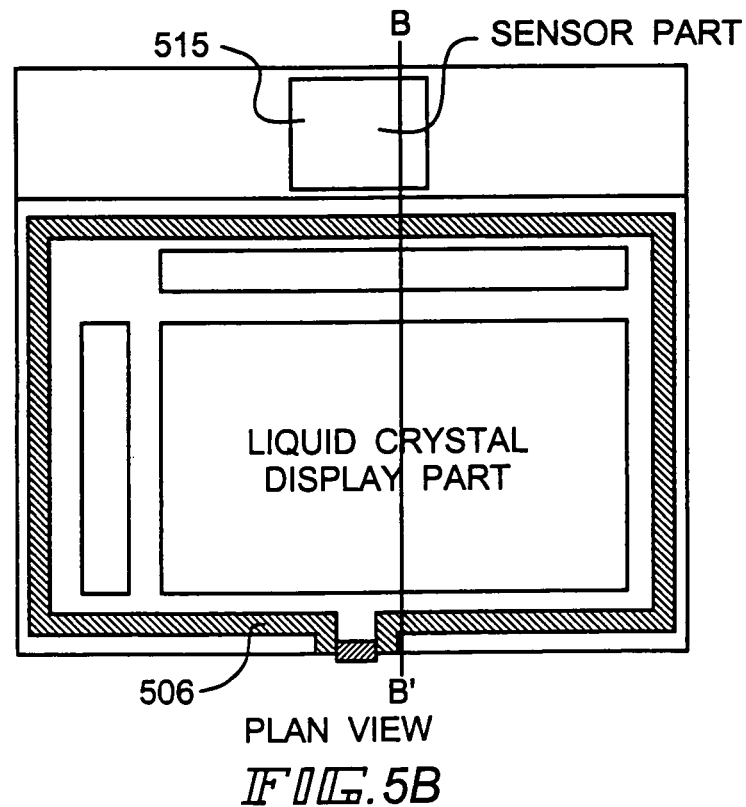
FIG. 5B is a diagrammatic plan view showing the structure of the liquid crystal panel of Example 4.
Figure 6D:
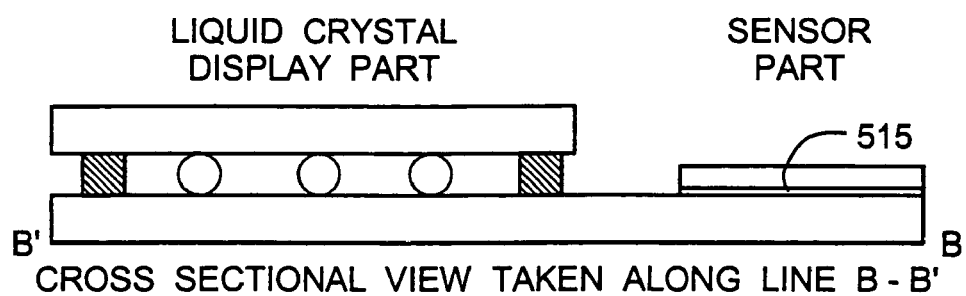
FIGS. 6D is a cross sectional view showing the structure of the liquid crystal panel of Example 4 taken on line B–B' of FIG. 5B.

The constitution of this Example is shown in FIGS. 5B and 6D.

By employing such a constitution, the sensor part can be completely isolated from the external atmosphere, and deterioration due to contact with the external atmosphere can be prevented. The distance between the sensor part and the counter substrate of the sensor part is from 0 to 5 µm, preferably 4 µm or less, and it is ideal that the counter substrate and the element substrate are in completely close contact with each other.

EXAMPLE 5

Figure 7:
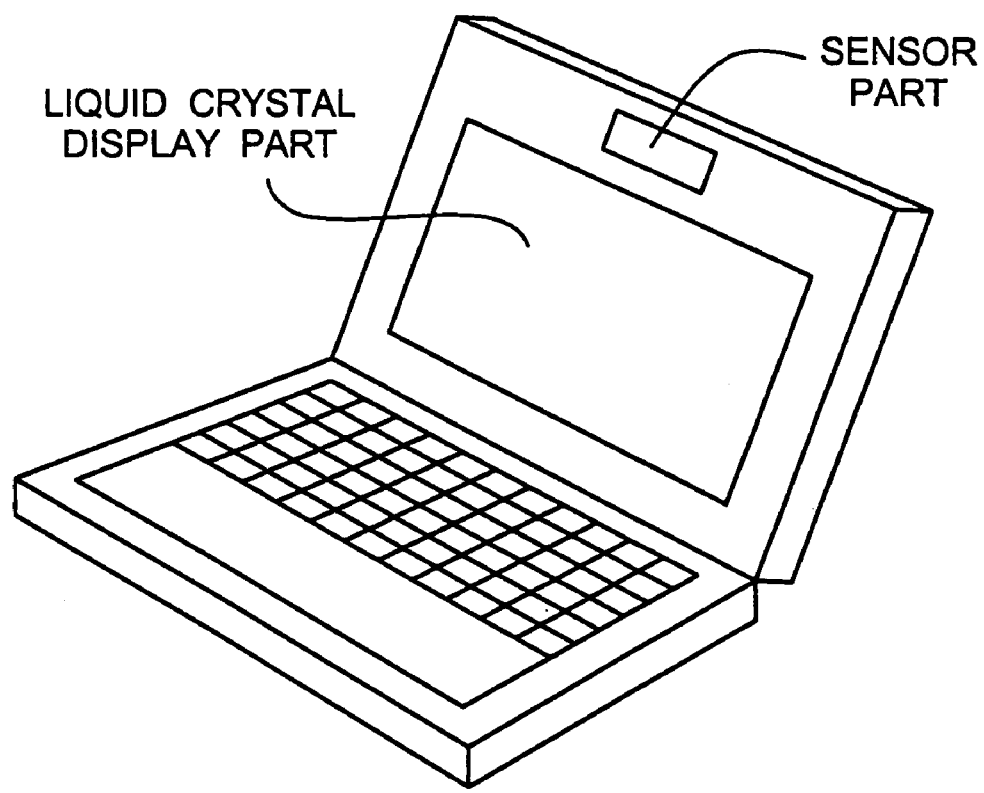
FIG. 7 is a schematic perspective view showing an example of an application of the invention.

In this Example, an electronic apparatus utilizing the liquid crystal panel according to the invention is exemplified in FIG. 7. The electronic apparatus is a product carrying the liquid crystal panel containing an image sensor.

FIG. 7 shows a notebook personal computer, in which the invention can be applied to a liquid crystal display having an image sensor integrated therein.

In the invention, because the image sensor is provided on the same substrate as the pixel matrix and the peripheral driver circuit, miniaturization and weight saving of the display apparatus having a display function and an image pickup function can be realized. Furthermore, because the sensor part and the display part are simultaneously formed, the display apparatus can be provided at low cost.

By employing the constitution of the invention, the inclusion of the liquid crystal into the sensor part on the injection step of the liquid crystal is prevented, and after the adhesion step, the sensor part is protected from the liquid crystal, dusts and an external impacts. Thus, a durable liquid crystal display apparatus containing an image sensor, in which the sensor part is well operated, can be obtained.

Furthermore, when the optical system is attached to the sensor part, the optical system can be sufficiently fixed, and the distance between the optical system and the sensor part can be maintained at a constant value by the sealing part and the counter substrate. Thus, an image of good quality with a stable focal distance can be obtained.

What is claimed is:

1. An electronic apparatus comprising:
a first substrate;
a display region of direct vision provided on an insulating surface over said first substrate;
a sensor region having a photoelectric conversion layer provided on said insulating surface over said first substrate;
a counter second substrate provided over said display region; and
a counter third substrate provided over said sensor region by using an adhesive.

2. An apparatus according to claim 1 wherein said electronic apparatus is incorporated into a personal computer.

3. An apparatus according to claim 1 wherein said sensor region comprises a switching transistor.

4. An apparatus according to claim 1 wherein said sensor region comprises a semiconductor film comprising amorphous silicon.

5. An electronic apparatus comprising:
a first substrate;
a display region of direct vision provided on an insulating surface over said first substrate;
a optical sensor region detecting light provided on said insulating surface over said first substrate;
a counter second substrate provided over said display region; and
a counter third substrate provided over said optical sensor region by using an adhesive.

6. An apparatus according to claim 5 wherein said electronic apparatus is incorporated into a personal computer.

7. An apparatus according to claim 5 wherein said optical sensor region comprises a switching transistor.

8. An apparatus according to claim 5 wherein said optical sensor region comprises a semiconductor film comprising amorphous silicon.

9. An electronic apparatus comprising:
a first substrate;
a display region of direct vision provided on an insulating surface over said first substrate, said display region comprising an active matrix circuit;
a sensor region having a photoelectric conversion layer provided on said insulating surface over said first substrate;
a counter second substrate provided over said display region; and
a counter third substrate provided over said sensor region by using an adhesive.

10. An apparatus according to claim 9 wherein said electronic apparatus is incorporated into a personal computer.

11. An apparatus according to claim 9 wherein said sensor region comprises a switching transistor.

12. An apparatus according to claim 9 wherein said sensor region comprises a semiconductor film comprising amorphous silicon.

13. An electronic apparatus comprising:
a first substrate;
a display region of direct vision provided on an insulating surface over said first substrate, said display region comprising an active matrix circuit;
a optical sensor region detecting light provided on said insulating surface over said first substrate;
a counter second substrate provided over said display region; and
a counter third substrate provided over said optical sensor region by using an adhesive.

14. An apparatus according to claim 13 wherein said electronic apparatus is incorporated into a personal computer.

15. An apparatus according to claim 13 wherein said optical sensor region comprises a switching transistor.

16. An apparatus according to claim 13 wherein said optical sensor region comprises a semiconductor film comprising amorphous silicon.

17. An electronic apparatus comprising:
a first substrate;
a display region of direct vision provided on an insulating surface over said first substrate, said display region comprising a thin film transistor;
a sensor region having a photoelectric conversion layer provided on said insulating surface over said first substrate;
a counter second substrate provided over said display region; and
a counter third substrate provided over said sensor region by using an adhesive.

18. An apparatus according to claim 17 wherein said electronic apparatus is incorporated into a personal computer.

19. An apparatus according to claim 17 wherein said sensor region comprises a switching transistor.

20. An apparatus according to claim 17 wherein said sensor region comprises a semiconductor film comprising amorphous silicon.

21. An electronic apparatus comprising:
a first substrate;
a display region of direct vision provided on an insulating surface over said first substrate, said display region comprising a thin film transistor;
a optical sensor region detecting light provided on said insulating surface over said first substrate;
a counter second substrate provided over said display region; and
a counter third substrate provided over said optical sensor region by using an adhesive.

22. An apparatus according to claim 21 wherein said electronic apparatus is incorporated into a personal computer.

23. An apparatus according to claim 21 wherein said optical sensor region comprises a switching transistor.

24. An apparatus according to claim 21 wherein said optical sensor region comprises a semiconductor film comprising amorphous silicon.

* * * * *